March 15, 1960  S. W. BENNETT  2,928,697
PIVOTED VALVE STRUCTURE
Filed Jan. 14, 1957  2 Sheets-Sheet 1

INVENTOR.
S.W. BENNETT
BY Hudson & Young
ATTORNEYS

March 15, 1960 S. W. BENNETT 2,928,697
PIVOTED VALVE STRUCTURE
Filed Jan. 14, 1957 2 Sheets-Sheet 2

INVENTOR.
S.W. BENNETT

BY Hudson & Young

ATTORNEYS

2,928,697

PIVOTED VALVE STRUCTURE

Sidney W. Bennett, Phillips, Tex., assignor to Phillips Petroleum Company, a corporation of Delaware Application January 14, 1957, Serial No. 633,990

4 Claims. (Cl. 308—36.1)

This invention relates to a pivoted valve structure. In one aspect it relates to a pivoted or hinged disc valve, provided with improved pivot means, adapted for insertion in a pipeline to control unidirectional flow of fluid therethrough.

Conventional pivoted disc valves have generally been found unsatisfactory as check valves in those processes where it is desired to control the unidirectional flow of fluids containing suspended solids, such as catalyst particles, or corrosive materials, such as hydrogen sulfide. They have been found wanting because this foreign material tends to enter the pivot means of the valve and lodge between the bearing surfaces, thus causing abrasion, sticking, corrosion, and the like. In addition, many of the conventional pivoted disc valves cannot be effectively lubricated because the lubricant is not confined but often tends to enter the fluid stream being controlled with the resulting contamination thereof. The maintenance or replacement of the pivot means of these valves is often tedious and costly, and many of these valves fail to efficiently retain their check valve characteristic. As such, the employment of these valves in such services as that mentioned hereinbefore has been curtailed.

Accordingly, an object of this invention is to provide an improved pivoted valve structure. Another object is to provide a pivoted or hinged disc valve, provided with improved pivot means, and especially adapted for insertion in a pipeline to control the unidirectional flow of fluids containing suspended solids, corrosive material, or other foreign material. Another object is to provide a pivoted disc valve which is provided with novel lubricating means that will effectively lubricate the bearing surfaces of the valve pivot means without contaminating the fluid stream being controlled by the valve. A further object is to provide an improved valve characterized by its dependability, simple construction, ease of assembly and insertion in a pipeline, and maintenance. Further objects and advantages of my invention will become apparent, to those skilled in the art, from the following discussion, appended claims, and the accompanying drawings in which:

Figure 1:
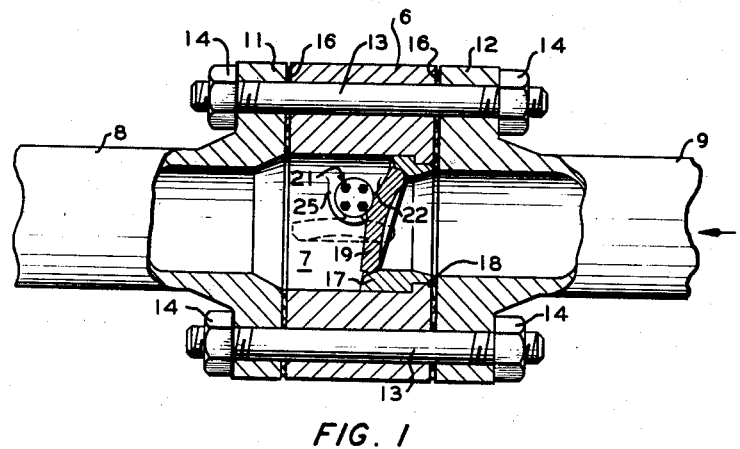
Figure 1 is a longitudinal sectional elevational view of a pipeline wherein the improved pivoted valve structure of my invention is inserted.

Referring to the drawing now and to Figure 1 in particular, the valve comprises a cylindrical housing or body 6 provided with an internal chamber or central passage 7. The housing 6 is inserted between two pipe sections 8, 9 and is secured between the respected flanges 11, 12 thereof by clamp bolts 13 and nuts 14 threaded on the opposite ends thereof; although the clamp bolts 13 are arranged in a circle (Figure 2), any other suitable bolt arrangement may be employed. Suitable packing material, such as gaskets 16, may be provided between adjacent faces of the housing 6 and flanges 11, 12. The central passage 7 can be provided with an inclined annular valve seat 17 which can be secured to the interior wall of the housing 6 by any suitable means, such as by welding 18. Pivotally mounted within the central passage 7 is a disc member 19 which is secured on opposite sides of its upper face or downstream side to pivot means generally designated 21 by means of brackets 22 or the like. The rim of the disc member 19 is adapted to seat in its closed position on the beveled face or seating surface of valve seat 17. The inclined seating surface of valve seat 17 and the relative location of the pivot means 21 are such as to permit the disc member 19 to swing freely between open and closed positions.

Figure 2:
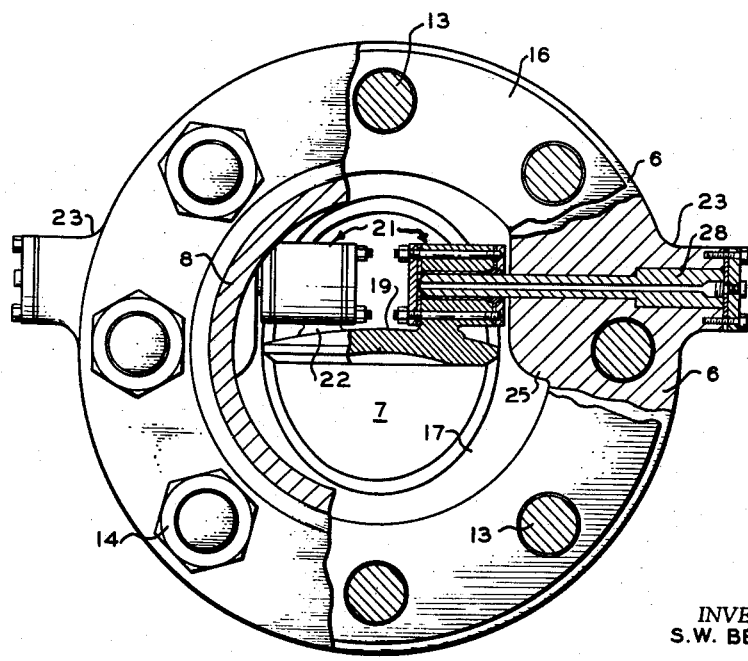
Figure 2 is an elevational cross-sectional view of Figure 1.
Figure 3:
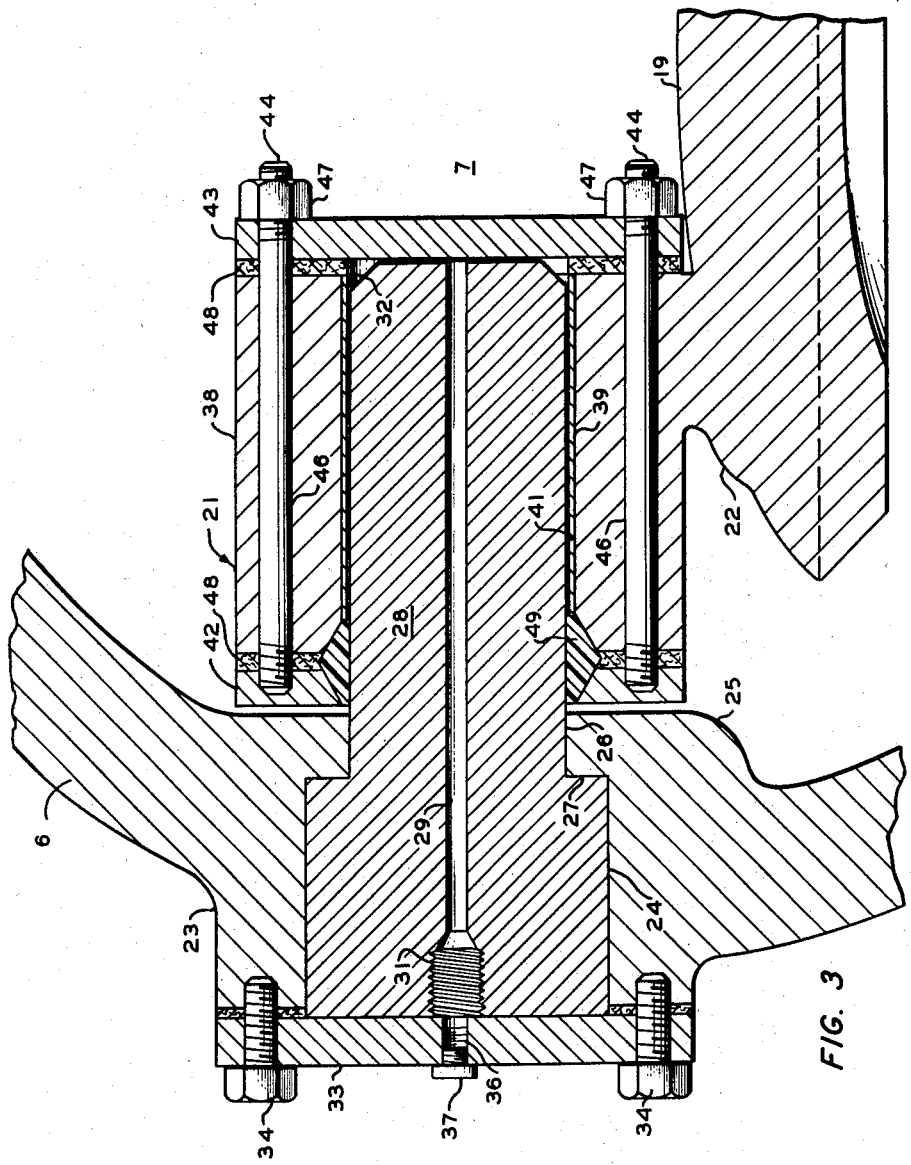
Figure 3 is an enlarged sectional view of a portion of Figure 2.

Referring now to Figures 2 and 3, a detailed description of the improved pivot means of my invention will be set forth. The housing 6 is provided with two external enlarged portions or bosses 23 which can lie in a plane parallel to and above the central axes of the pipe sections 8, 9. Each boss 23 is provided with a passage 24 which communicates with an opening 26 in the internal boss face 25; a shoulder can be provided at 27. A stationary, cylindrical pivot pin 28, the outer end of which is enlarged and positioned within passage 24, extends within the interior of housing 6, the distance being limited by reason of shoulder 27. Alternatively, the extension of the pivot pin 28 within the interior of the housing 6 can be limited by other means, for example, a suitable set screw passing through the boss 23 into the annular enlarged portion of the pivot pin 28. The latter can be provided with an axial passage 29, the outer end of which can be enlarged and threaded as at 31, and is adapted to facilitate the flow of a suitable lubricant. The inner end of the pivot pin 28 may be chamfered as at 32 to facilitate the insertion of the pivot pin 28. A cover plate 33 is provided across the outer opening of the boss 23 and is secured thereto by bolts 34 or the like. The plate 33 can be provided with a suitable tap hole 36 in which a removable plug 37 is inserted.

Each pivot means 21 comprises a bearing 38 which is secured to or made integral with bracket 22. Bearing 38 is provided with a central passage 39 in which a suitable bushing 41 can be inserted. The latter may be made of suitable oil-impregnated material and it may be employed alone or in combination with the lubricant passage 29. Pivot means 21 is provided with an outer annular plate 42 and an inner circular plate 43. Annular plate 42 is provided with a plurality of inwardly projecting studs 44 which pass through suitable passages 46 in bearing member 38 and project therefrom through suitable openings in circular plate 43, the protruding threaded ends being provided with nuts 47. Suitable packing materials, such as gaskets 48, may be interposed between adjacent faces of bearing 38 and plates 42, 43. The reduced inner portion of pivot pin 28 passes through bushing 41, the inner end of the pin adjacent the inner face of circular plate 43. The adjacent inner walls of annular plate 42 and bearing member 38 are beveled as shown to provide a groove for suitable sealing means, such as the wedge-shaped ring seal 49. A space is preferably provided between adjacent portions of boss face 25 and annular plate 42.

From the foregoing discussion, it is readily apparent that the ingress of foreign material, such as catalyst particles or corrosive gases, into the pivot means of my invention is effectively prevented with the result that the bearing surfaces will be free from abrasion, corrosion, sticking, and the like. The free swinging of the disc member 19 is thus insured and the improved valve structure of this invention can be employed for service in pipelines conducting fluids containing suspended solid material or other foreign material without the same deleteriously effecting the operation of the pivot means. Moreover, the bearing surfaces can be effectively lubricated without egress of lubricant into the stream being controlled thereby preventing contamination thereof.

The improved pivot valve structure of my invention is easily assembled and can be readily inserted and removed from its pipeline. The valve structure can be assembled and inserted in the pipeline in the following manner. Pivot members 38, 41, 42, 43, 49 with the attached disc member 19 can be assembled outside of the valve housing 6, with the nuts 47 somewhat loose. This structure may then be inserted within the central passage 7 of the housing 6. With the outer opening of bosses 23 uncovered, the pivot pins 28 are inserted through the boss passages 24 into the interior of the housing 6, the inner ends sliding into the bushings 41 until they abut the outer faces of the circular plates 43. Nuts 47 are then tightened to compress the ring seal 49. Cover plates 33 are then bolted to the bosses 23, lubricant introduced into passages 29 and plug 37 inserted in place, and the assembled valve structure is inserted between adjacent ends of two pipe sections and bolted to the flanges thereof.

Various modifications and alterations of my invention will become apparent, to those skilled in the art, without departing from the scope and spirit of my invention, and it is to be understood that the foregoing discussion and accompanying drawing merely represent preferred embodiments of my invention and the same is not unduly limited thereto.

I claim:

1. A bearing adapted to be mounted on a wall, said bearing comprising a cylindrical pivotal housing having an axial bore, a stationary cylindrical pin adapted to project through said wall and extend into said bore, said housing and pin having engageable cylindrical bearing surfaces, a closure plate removably secured to one end of said housing and sealing the adjacent end of said bore, an annular plate removably secured to said housing adjacent said wall and sealing the other adjacent end of said bore, a ring seal interposed between adjacent portions of said housing and said pin near said other end of said bore, and means fastening together said closure plate, said annular plate, and said housing so as to permit said fastened members to pivot about said pin.

2. A bearing adapted to be mounted on a wall, said bearing comprising a cylindrical pivotal housing having an axial bore, a stationary cylindrical pin adapted to project through said wall and extend into said bore, that portion of said pin projecting through said wall having an outer cylindrical shoulder which is adapted to register with a corresponding shoulder in the passageway provided in said wall to limit the distance said pin extends within said bore, said housing and pin having engageable cylindrical bearing surfaces, a closure plate removably secured to one end of said housing and sealing the adjacent end of said bore, an annular plate removably secured to said housing adjacent said wall and sealing the other adjacent end of said bore, a ring seal interposed between adjacent portions of said housing and said pin near said other end of said bore, and a plurality of studs attached to said closure and annular plates and passing through passages provided in said housing so as to fasten them together to permit them to pivot about said pin.

3. A bearing adapted to be mounted on a wall, said bearing comprising a cylindrical pivotal housing having an axial bore, a bushing disposed within said bore, a stationary cylindrical pin adapted to project through a passageway provided in said wall and extend from one side of said wall into said bore, said pin provided with a lubricating passage extending the length thereof, said pin and bushing having engageable cylindrical bearing surfaces, that portion of said pin projecting through said wall having an outer cylindrical shoulder which is adapted to register with a corresponding shoulder in the passageway provided in said wall to limit the distance said pin extends within said bore, a circular closure plate removably secured to one end of said housing and sealing the adjacent end of said bore, an annular plate removably secured to said housing adjacent said wall and sealing the other adjacent end of said bore, a wedge-shaped sealing ring surrounding said pin and interposed between adjacent portions of said housing and said pin near said other end of said bore, a cover plate adapted to be secured to the other side of said wall of seal said passageway, said cover plate having a normally closed lubricant tap hole communicating with said lubricating passage in said pin, and a plurality of studs attached to said closure and annular plates and passing through passages provided in said housing so as to fasten them together to permit them to pivot about said pin.

4. The bearing of claim 3 wherein said bushing is oil-impregnated.

References Cited in the file of this patent

UNITED STATES PATENTS

| | | |
|---|---|---|
| 740,807 | Clune | Oct. 6, 1903 |
| 755,284 | Dixon | Mar. 22, 1904 |
| 1,216,769 | Blood | Feb. 20, 1917 |
| 1,389,127 | Constant | Aug. 30, 1921 |
| 1,505,552 | Garner et al. | Aug. 19, 1924 |
| 2,268,518 | Sonderman et al. | Dec. 30, 1941 |
| 2,368,149 | Lee | Jan. 30, 1945 |
| 2,700,579 | Scott | Jan. 25, 1955 |
| 2,711,188 | Nickerson | June 21, 1955 |
| 2,756,017 | Silverman | July 24, 1956 |

UNITED STATES PATENT OFFICE

CERTIFICATE OF CORRECTION

Patent No. 2,928,697                                                   March 15, 1960

Sidney W. Bennett

It is hereby certified that error appears in the printed specification of the above numbered patent requiring correction and that the said Letters Patent should read as corrected below.

Column 4, line 31, for "of", second occurrence, read -- to --.

Signed and sealed this 29th day of November 1960.

(SEAL)
Attest:
KARL H. AXLINE
Attesting Officer

ROBERT C. WATSON
Commissioner of Patents